(12) United States Patent
Sun et al.

(10) Patent No.: US 12,705,200 B2
(45) Date of Patent: Aug. 11, 2026

(54) ARM SECURITY FIRMWARE CONFIGURATION METHOD AND APPARATUS APPLIED TO ARM SERVER

(71) Applicant: SUZHOU METABRAIN INTELLIGENT TECHNOLOGY CO., LTD., Suzhou (CN)

(72) Inventors: Xiuqiang Sun, Suzhou (CN); Guozhi Han, Suzhou (CN); Baojun Liu, Suzhou (CN); Shanbin Ai, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/144,055

(22) PCT Filed: Jun. 18, 2024

(86) PCT No.: PCT/CN2024/099921
§ 371 (c)(1),
(2) Date: Jun. 27, 2025

(87) PCT Pub. No.: WO2025/112463
PCT Pub. Date: Jun. 5, 2025

(65) Prior Publication Data

US 2026/0119436 A1 Apr. 30, 2026

(30) Foreign Application Priority Data

Nov. 30, 2023 (CN) ........................ 202311628371.X

(51) Int. Cl.
*G06F 13/40* (2006.01)

(52) U.S. Cl.
CPC .. *G06F 13/4027* (2013.01); *G06F 2213/0026* (2013.01)

(58) Field of Classification Search
CPC ..................... G06F 13/4027; G06F 2213/0026
See application file for complete search history.

(56) References Cited

U.S. PATENT DOCUMENTS

2009/0254776 A1* 10/2009 Gonzalez ............ G06F 11/1068 714/E11.038
2017/0068636 A1 3/2017 Vishwanathan et al.

FOREIGN PATENT DOCUMENTS

| | | |
|---|---|---|
| CN | 109542752 A | 3/2019 |
| CN | 109614259 A | 4/2019 |
| CN | 114138587 A | 3/2022 |
| CN | 114185607 A | 3/2022 |
| CN | 114201360 A | 3/2022 |
| CN | 116302145 A | 6/2023 |

(Continued)

*Primary Examiner* — Steven G Snyder
*Assistant Examiner* — John B Roche
(74) *Attorney, Agent, or Firm* — IPro, PLLC

(57) ABSTRACT

A method and apparatus for configuring an ARM safe firmware applied to an ARM server. The method includes: invoking the ARM safe firmware of the ARM server, and configuring a space register for a PCI link bridge and PCI devices of hierarchies of a quantity N under the PCI link bridge, wherein the ARM safe firmware is a processor firmware of the ARM server, and N is a positive integer greater than or equal to 3; and inside the ARM safe firmware, adding AER error-identification data of all of CPUs of the ARM server.

19 Claims, 7 Drawing Sheets

(56) References Cited

FOREIGN PATENT DOCUMENTS

| | | | | |
|---|---|---|---|---|
| CN | 116700821 | A | 9/2023 | |
| CN | 117331723 | A | 1/2024 | |
| WO | WO-2011071490 | A1 * | 6/2011 | ............ G06F 11/079 |
| WO | 2023151287 | A1 | 8/2023 | |

* cited by examiner invoking the ARM safe firmware of the ARM server, and configuring a space register for a PCI link bridge and PCI devices of hierarchies of a quantity N under the PCI link bridge, wherein the ARM safe firmware is a processor firmware of the ARM server, and N is a positive integer greater than or equal to 3

101 inside the ARM safe firmware, adding AER error-identification data of all of CPUs of the ARM server

Figures 1, 2:
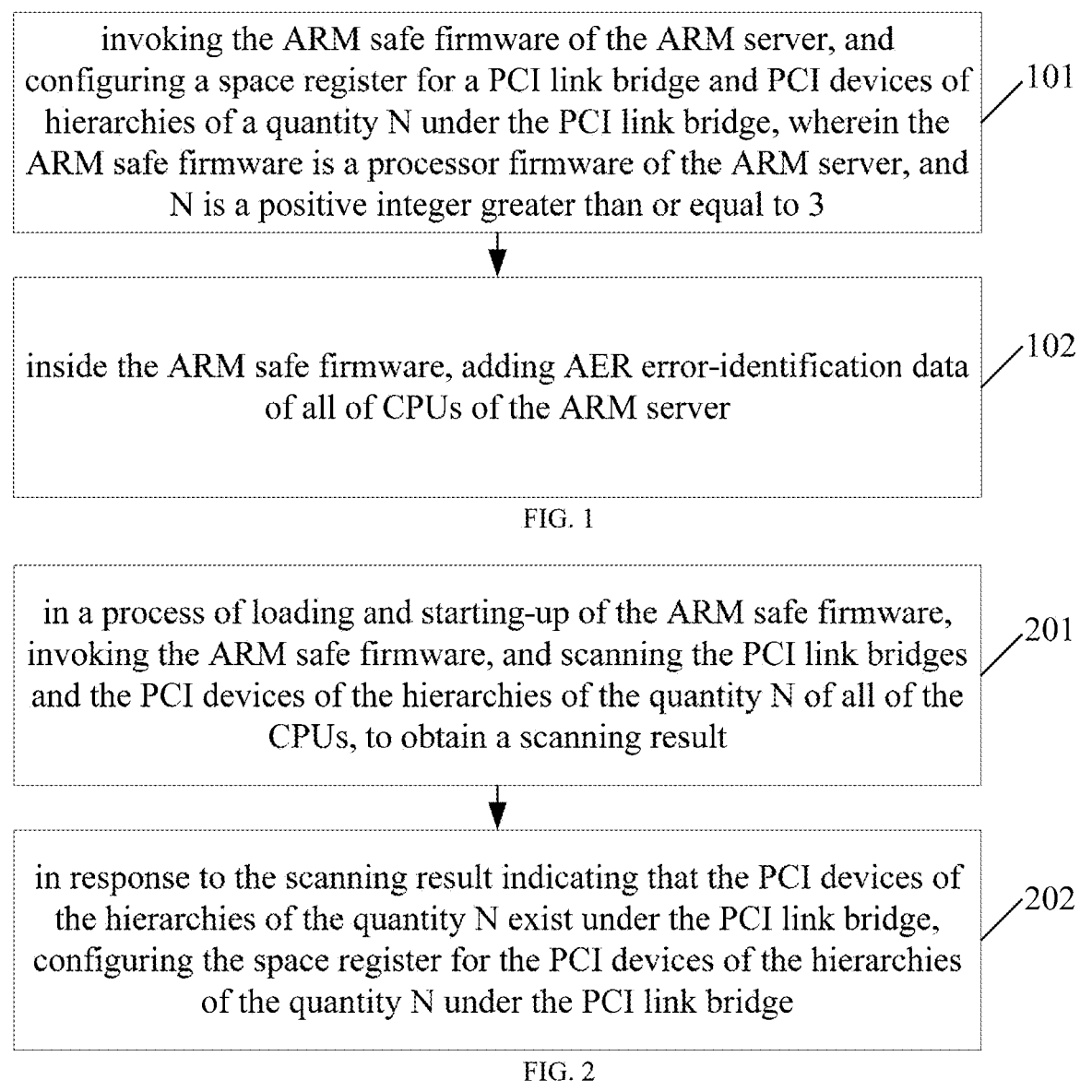

102

FIG. 1 in a process of loading and starting-up of the ARM safe firmware, invoking the ARM safe firmware, and scanning the PCI link bridges and the PCI devices of the hierarchies of the quantity N of all of the CPUs, to obtain a scanning result

201 in response to the scanning result indicating that the PCI devices of the hierarchies of the quantity N exist under the PCI link bridge, configuring the space register for the PCI devices of the hierarchies of the quantity N under the PCI link bridge

202

FIG. 2 in response to the internal-memory initialization of the ARM safe firmware having been completed, invoking the ARM safe firmware, and scanning the PCI link bridges and the PCI devices of the hierarchies of the quantity N of all of the CPUs, to obtain the scanning result

501 configuring a PCI configuring space corresponding to the PCI link bridge in an internal memory that has been initialized

Figures 5, 6:
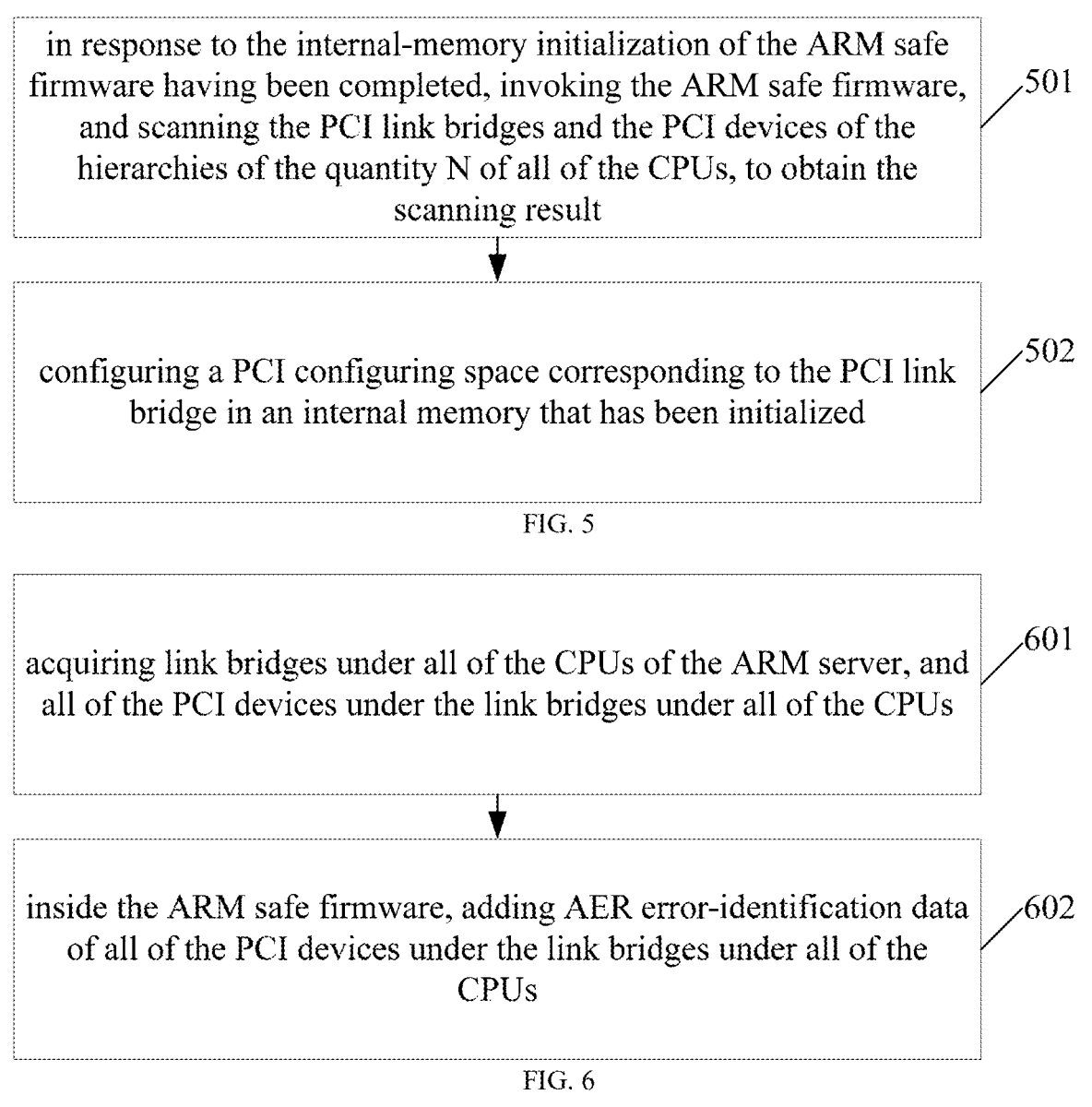

502

FIG. 5 acquiring link bridges under all of the CPUs of the ARM server, and all of the PCI devices under the link bridges under all of the CPUs

601 inside the ARM safe firmware, adding AER error-identification data of all of the PCI devices under the link bridges under all of the CPUs

602

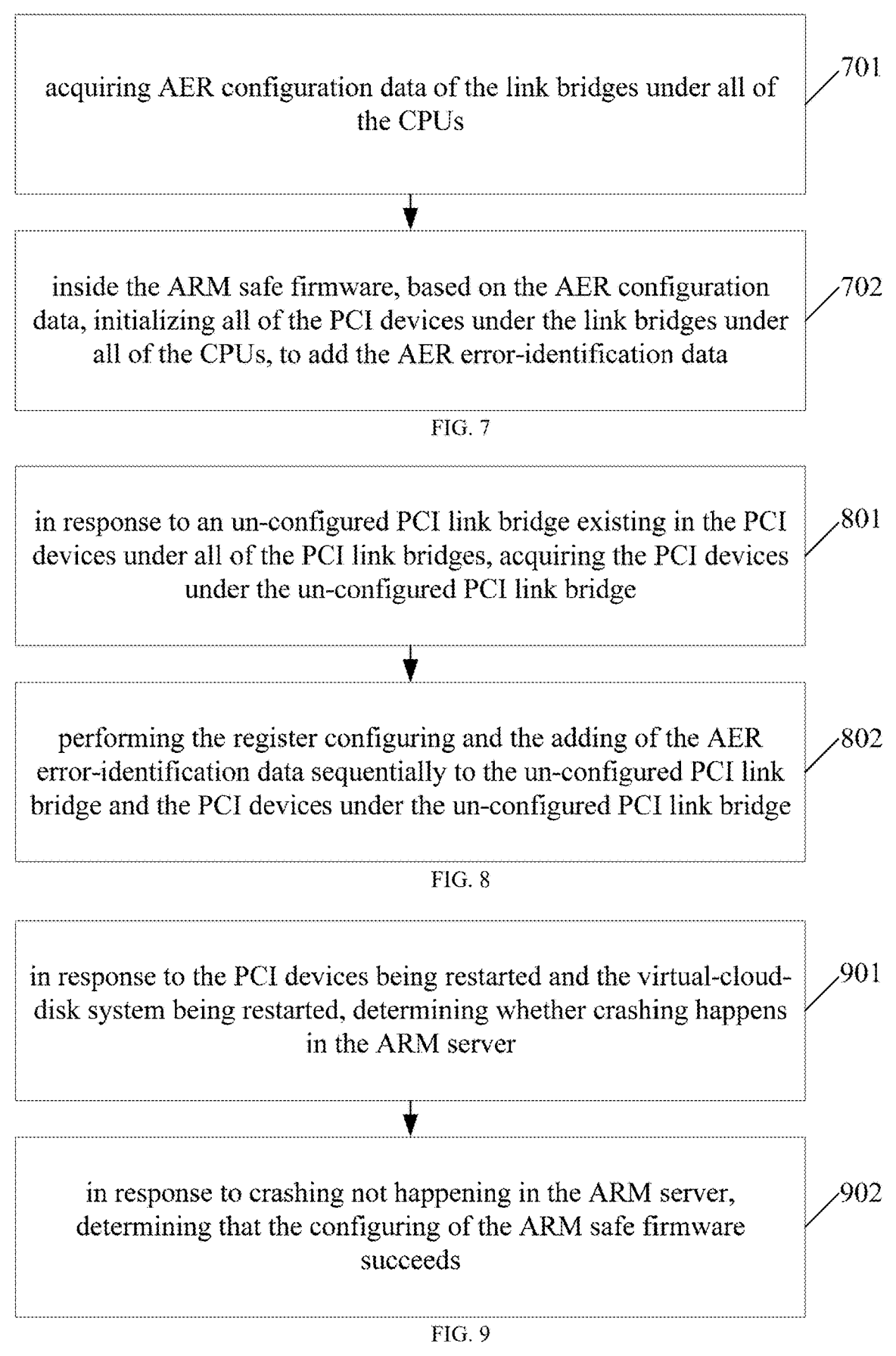

FIG. 6 acquiring AER configuration data of the link bridges under all of the CPUs
701 inside the ARM safe firmware, based on the AER configuration data, initializing all of the PCI devices under the link bridges under all of the CPUs, to add the AER error-identification data
702

FIG. 7 in response to an un-configured PCI link bridge existing in the PCI devices under all of the PCI link bridges, acquiring the PCI devices under the un-configured PCI link bridge
801 performing the register configuring and the adding of the AER error-identification data sequentially to the un-configured PCI link bridge and the PCI devices under the un-configured PCI link bridge
802

FIG. 8 in response to the PCI devices being restarted and the virtual-cloud-disk system being restarted, determining whether crashing happens in the ARM server
901 in response to crashing not happening in the ARM server, determining that the configuring of the ARM safe firmware succeeds
902

FIG. 9

ARM SECURITY FIRMWARE CONFIGURATION METHOD AND APPARATUS APPLIED TO ARM SERVER

CROSS-REFERENCE TO RELATED APPLICATION

The present application claims the priority of the Chinese patent application filed on Nov. 30, 2023 before the Chinese Patent Office with the application number of 202311628371.X and the title of "ARM SECURITY FIRMWARE CONFIGURATION METHOD AND APPARATUS APPLIED TO ARM SERVER", which is incorporated herein in its entirety by reference.

FIELD

The present application relates to the technical field of chips, and particularly relates to a method and apparatus for configuring an ARM safe firmware applied to an ARM server.

BACKGROUND

The ARM (Advanced RISC Machines) server that Internet users purchase does not only support replacement of the storage function and the cloud services of the traditional X86 server, but also supports replacement of the function in the AI (Artificial Intelligence) field, for example, based on the ARM server, adding a T4 card and a DPU (Graphics Processing Unit) card to provide a physical combination. Based on such a configuration, the users are used to installing a virtual cloud disk in the hard disk of the DPU device, and at the same time initializing and using all of the PCI peripheral devices of the ARM server in the virtual-cloud-disk system of the DPU. Because the DPU can support the installation and usage of a plurality of virtual cloud disks, as a result the PCI peripheral devices in the ARM server can be used by different cloud-disk systems at any time. When the usage of a PCI peripheral device in one of the cloud-disk systems has been completed, it is required to restart that PCI device such as a T4 card, and merely after the restarting of the T4 card has been completed, another cloud-disk system can normally use that physical T4 card.

However, when the T4 card is restarted under the cloud-disk systems of the ARM server, crashing might happen, which causes that the T4 card under the cloud-disk systems cannot be restarted, and therefore the entire ARM server also crashes and cannot be normally used.

SUMMARY

The embodiments of the present application provide a method and apparatus for configuring an ARM safe firmware applied to an ARM server.

In order to solve the above technical problem, the embodiments of the present application are realized as follows:

In the first aspect, an embodiment of the present application provides a method for configuring an ARM safe firmware applied to an ARM server, wherein the method comprises:

invoking the ARM safe firmware of the ARM server, and configuring a space register for a PCI link bridge and PCI devices of hierarchies of a quantity N under the PCI link bridge, wherein the ARM safe firmware is a processor firmware of the ARM server, and N is a positive integer greater than or equal to 3; and inside the ARM safe firmware, adding AER error-identification data of all of CPUs of the ARM server.

In some embodiments, the step of invoking the ARM safe firmware of the ARM server, and configuring the space register for the PCI link bridge and the PCI devices of the hierarchies of the quantity N under the PCI link bridge comprises:

in a process of loading and starting-up of the ARM safe firmware, invoking the ARM safe firmware, and scanning the PCI link bridges and the PCI devices of the hierarchies of the quantity N of all of the CPUs, to obtain a scanning result; and in response to the scanning result indicating that the PCI devices of the hierarchies of the quantity N exist under the PCI link bridge, configuring the space register for the PCI devices of the hierarchies of the quantity N under the PCI link bridge.

In some embodiments, the step of configuring the space register for the PCI devices of the hierarchies of the quantity N under the PCI link bridge comprises:

initializing the PCI devices of the hierarchies of the quantity N under the PCI link bridge; and configuring the space register for the PCI devices of the hierarchies of the quantity N under the PCI link bridge.

In some embodiments, before the step of invoking the ARM safe firmware, and scanning the PCI link bridges and the PCI devices of the hierarchies of the quantity N of all of the CPUs, to obtain the scanning result, the method comprises:

in response to the ARM server having been started up and loading of a BIOS having succeeded, loading the ARM safe firmware;

performing safe-starting-up checking to the ARM safe firmware; and in response to the safe-starting-up checking of the ARM safe firmware having succeeded, performing internal-memory initialization of the ARM safe firmware.

In some embodiments, the step of invoking the ARM safe firmware, and scanning the PCI link bridges and the PCI devices of the hierarchies of the quantity N of all of the CPUs, to obtain the scanning result comprises:

in response to the internal-memory initialization of the ARM safe firmware having been completed, invoking the ARM safe firmware, and scanning the PCI link bridges and the PCI devices of the hierarchies of the quantity N of all of the CPUs, to obtain the scanning result; and configuring a PCI configuring space corresponding to the PCI link bridge in an internal memory that has been initialized.

In some embodiments, the step of invoking the ARM safe firmware, and scanning the PCI link bridges and the PCI devices of the hierarchies of the quantity N of all of the CPUs further comprises:

according to a state of division of the PCI link bridge, scanning the PCI link bridge and the PCI devices of the hierarchies of the quantity N.

In some embodiments, the step of configuring the space register for the PCI devices of the hierarchies of the quantity N under the PCI link bridge comprises:

inside the PCI configuring space, configuring space registers individually for the PCI devices of the hierarchies of the quantity N under the PCI link bridge.

In some embodiments, after the step of invoking the ARM safe firmware, and scanning the PCI link bridges and the PCI devices of the hierarchies of the quantity N of all of the CPUs, to obtain the scanning result, the method further comprises:

in response to the scanning result indicating that the hierarchies of the PCI devices under the PCI link bridge are less than N, reserving a register configuring space corresponding to the PCI link bridge inside the PCI configuring space.

In some embodiments, after the step of reserving the register configuring space corresponding to the PCI link bridge inside the PCI configuring space, the method further comprises:

inside the reserved register configuring space, configuring the space register for the PCI devices of the hierarchies of the quantity N that are accessed subsequently.

In some embodiments, the step of, inside the ARM safe firmware, adding the AER error-identification data of all of the CPUs of the ARM server comprises:

acquiring link bridges under all of the CPUs of the ARM server, and all of the PCI devices under the link bridges under all of the CPUs; and inside the ARM safe firmware, adding AER error-identification data of all of the PCI devices under the link bridges under all of the CPUs.

In some embodiments, the step of, inside the ARM safe firmware, adding the AER error-identification data of all of the PCI devices under the link bridges under all of the CPUs comprises:

acquiring AER configuration data of the link bridges under all of the CPUs; and inside the ARM safe firmware, based on the AER configuration data, initializing all of the PCI devices under the link bridges under all of the CPUs, to add the AER error-identification data.

In some embodiments, after the step of adding the AER error-identification data of all of CPUs of the ARM server, the method further comprises:

detecting whether the PCI devices under all of instances of the PCI link bridge under the ARM safe firmware have been completely configured; and in response to the PCI devices under all of the PCI link bridges having been completely configured, starting up an UEFI firmware of the ARM server, and starting up and loading a virtual-cloud-disk system.

In some embodiments, after the step of detecting whether the PCI devices under all of the PCI link bridges under the ARM safe firmware have been completely configured, the method further comprises:

in response to an un-configured PCI link bridge existing in the PCI devices under all of the PCI link bridges, acquiring the PCI devices under the un-configured PCI link bridge; and performing the register configuring and the adding of the AER error-identification data sequentially to the un-configured PCI link bridge and the PCI devices under the un-configured PCI link bridge.

In some embodiments, after the step of starting up the UEFI firmware of the ARM server, and starting up and loading the virtual-cloud-disk system, the method further comprises:

in response to the PCI devices being restarted and the virtual-cloud-disk system being restarted, determining whether crashing happens in the ARM server; and in response to crashing not happening in the ARM server, determining that the configuring of the ARM safe firmware succeeds.

In some embodiments, the step of, in response to the PCI devices being restarted and the virtual-cloud-disk system being restarted, determining whether crashing happens in the ARM server comprises:

in response to the PCI devices not having a problem of restarting crashing, and the virtual-cloud-disk operating system not having the problem of restarting crashing either, determining that crashing does not happen in the ARM server.

In some embodiments, after the step of determining whether crashing happens in the ARM server, the method further comprises:

in response to crashing happening in the ARM server, outputting a crashing alarming message.

In some embodiments, the ARM server comprises at least one instance of the CPUs.

In the second aspect, an embodiment of the present application provides an apparatus for configuring an ARM safe firmware applied to an ARM server, wherein the apparatus comprises:

a register configuring module configured for invoking the ARM safe firmware of the ARM server, and configuring a space register for a PCI link bridge and PCI devices of hierarchies of a quantity N under the PCI link bridge, wherein the ARM safe firmware is a processor firmware of the ARM server, and N is a positive integer greater than or equal to 3; and an AER-data adding module configured for, inside the ARM safe firmware, adding AER error-identification data of all of CPUs of the ARM server.

In some embodiments, the register configuring module comprises:

a scanning-result acquiring unit configured for, in a process of loading and starting-up of the ARM safe firmware, invoking the ARM safe firmware, and scanning the PCI link bridges and the PCI devices of the hierarchies of the quantity N of all of the CPUs, to obtain a scanning result; and a space-register configuring unit configured for, in response to the scanning result indicating that the PCI devices of the hierarchies of the quantity N exist under the PCI link bridge, configuring the space register for the PCI devices of the hierarchies of the quantity N under the PCI link bridge.

In some embodiments, the space-register configuring unit comprises:

a PCI-device initializing subunit configured for initializing the PCI devices of the hierarchies of the quantity N under the PCI link bridge; and a space-register configuring subunit configured for configuring the space register for the PCI devices of the hierarchies of the quantity N under the PCI link bridge.

In some embodiments, the apparatus comprises:

an ARM-safe-firmware loading module configured for, in response to the ARM server having been started up and loading of a BIOS having succeeded, loading the ARM safe firmware;

a safe-starting-up checking module configured for performing safe-starting-up checking to the ARM safe firmware; and an internal-memory initializing module configured for, in response to the safe-starting-up checking of the ARM safe firmware having succeeded, performing internal-memory initialization of the ARM safe firmware.

In some embodiments, the scanning-result acquiring unit comprises:

a scanning-result acquiring subunit configured for, in response to the internal-memory initialization of the ARM safe firmware having been completed, invoking the ARM safe firmware, and scanning the PCI link bridges and the PCI devices of the hierarchies of the quantity N of all of the CPUs, to obtain the scanning result; and a PCI-configuring-space configuring subunit configured for configuring a PCI configuring space corresponding to the PCI link bridge in an internal memory that has been initialized.

In some embodiments, the space-register configuring unit comprises:

a register configuring subunit configured for, inside the PCI configuring space, configuring space registers individually for the PCI devices of the hierarchies of the quantity N under the PCI link bridge.

In some embodiments, the apparatus further comprises:

a configuring-space reserving module configured for, in response to the scanning result indicating that the hierarchies of the PCI devices under the PCI link bridge are less than N, reserving a register configuring space corresponding to the PCI link bridge inside the PCI configuring space.

In some embodiments, the AER-data adding module comprises:

a PCI-device acquiring unit configured for acquiring link bridges under all of the CPUs of the ARM server, and all of the PCI devices under the link bridges under all of the CPUs; and an AER-data adding unit configured for, inside the ARM safe firmware, adding AER error-identification data of all of the PCI devices under the link bridges under all of the CPUs.

In some embodiments, the AER-data adding unit comprises:

a configuration-data acquiring subunit configured for acquiring AER configuration data of the link bridges under all of the CPUs; and an AER-data adding subunit configured for, inside the ARM safe firmware, based on the AER configuration data, initializing all of the PCI devices under the link bridges under all of the CPUs, to add the AER error-identification data.

In some embodiments, the apparatus further comprises:

a configuring-completion detecting module configured for detecting whether the PCI devices under all of instances of the PCI link bridge under the ARM safe firmware have been completely configured; and a virtual-cloud-disk-system loading module configured for, in response to the PCI devices under all of the PCI link bridges having been completely configured, starting up an UEFI firmware of the ARM server, and starting up and loading a virtual-cloud-disk system.

In some embodiments, the apparatus further comprises:

an un-configured-device acquiring module configured for, in response to an un-configured PCI link bridge existing in the PCI devices under all of the PCI link bridges, acquiring the PCI devices under the un-configured PCI link bridge; and a PCI-device configuring module configured for performing the register configuring and the adding of the AER error-identification data sequentially to the un-configured PCI link bridge and the PCI devices under the un-configured PCI link bridge.

In some embodiments, the apparatus further comprises:

a crashing determining module configured for, in response to the PCI devices being restarted and the virtual-cloud-disk system being restarted, determining whether crashing happens in the ARM server; and a configuring-succeeding determining module configured for, in response to crashing not happening in the ARM server, determining that the configuring of the ARM safe firmware succeeds.

In the third aspect, an embodiment of the present application provides an electronic device, wherein the electronic device comprises:

a memory, a processor and a computer program that is stored in the memory and is executable in the processor, and the computer program, when executed by the processor, implements the method for configuring an ARM safe firmware applied to an ARM server according to any one of the above embodiments.

In the fourth aspect, an embodiment of the present application provides a non-volatile computer-readable storage medium, wherein an instruction in the storage medium, when executed by a processor of an electronic device, enables the electronic device to implement the method for configuring an ARM safe firmware applied to an ARM server according to any one of the above embodiments.

In the embodiments of the present application, the ARM safe firmware of the ARM server is invoked, and a space register for a PCI link bridge and PCI devices of hierarchies of a quantity N under the PCI link bridge is configured, wherein the ARM safe firmware is a processor firmware of the ARM server, and N is a positive integer greater than or equal to 3. Inside the ARM safe firmware, the AER error-identification data of all of the CPUs of the ARM server are added. In the embodiments of the present application, by increasing the scanning hierarchies in the ATF firmware of the PCI link bridges and the PCI devices and configuring the register configuration, wherein regardless of a single-channel server or a double-channel server, it is required to add the AER-error-data-identification function for each of the PCI link bridges and the PCI devices of all of the CPUs in the ATF, the problem of crashing in restarting under a DPU virtual-cloud-disk system or in restarting of the PCI devices under a DPU virtual-cloud-disk system may be effectively solved.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application will be provided below.

BRIEF DESCRIPTION OF THE DRAWINGS

In order to more clearly illustrate the technical solutions of the embodiments of the present application, the figures that are required to describe the embodiments of the present application will be briefly described below. Apparently, the figures that are described below are embodiments of the present application, and a person skilled in the art can obtain other figures according to these figures without paying creative work.

FIG. 1 is a flow chart of the steps of a method for configuring an ARM safe firmware applied to an ARM server according to an embodiment of the present application;

FIG. 2 is a flow chart of the steps of a method for configuring a space register according to an embodiment of the present application;

FIG. 5 is a flow chart of the steps of a method for configuring a PCI configuring space according to an embodiment of the present application;

FIG. 6 is a flow chart of the steps of a method for adding AER error-identification data according to an embodiment of the present application;

FIG. 7 is a flow chart of the steps of another method for adding AER error-identification data according to an embodiment of the present application;

FIG. 8 is a flow chart of the steps of a method for configuring a PCI device according to an embodiment of the present application;

FIG. 9 is a flow chart of the steps of a method for determining succeeding of configuring of an ARM safe firmware according to an embodiment of the present application;

DETAILED DESCRIPTION

Figures 3, 4:
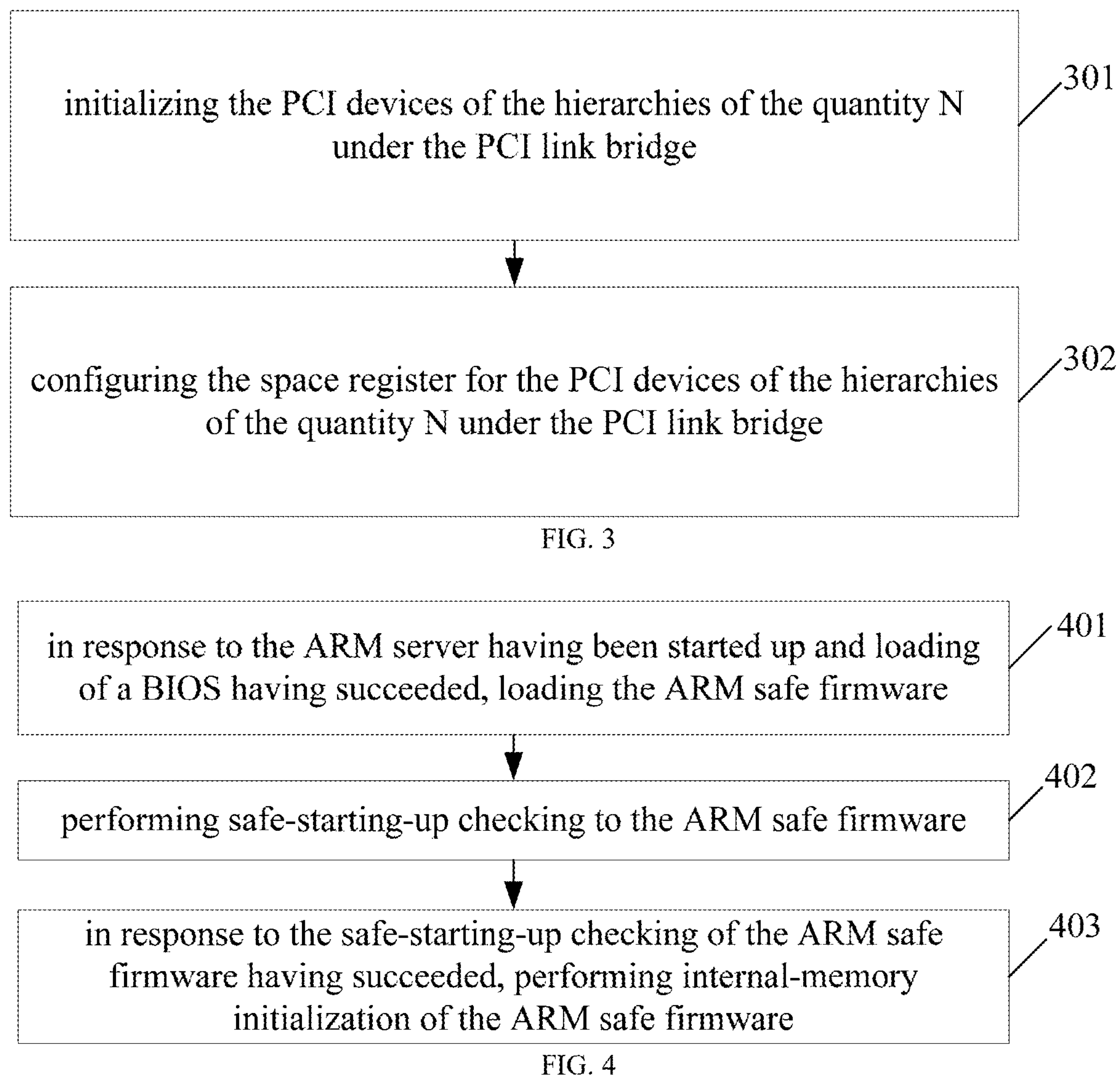
FIG. 3 is a flow chart of the steps of another method for configuring a space register according to an embodiment of the present application.
FIG. 4 is a flow chart of the steps of a method for starting up an ARM safe firmware according to an embodiment of the present application.

An ARM-architecture processor firmware may be divided into two parts, wherein one part is the ATF (Arm Trusted Firmware, or the ARM safe firmware) firmware unique for the ARM architecture, and the other part is the traditional UEFI firmware. All of processors of any architecture are required to support the UEFI firmware and all of the various normalized protocols are unified. However, the ATF firmware is a firmware unique for the ARM architecture. The ATF firmware involves the supporting of the fundamental functions of PCI devices such as the safe-starting-up checking of the ARM, the internal-memory initialization, the initialization of the PCI (Peripheral Component Interconnect, or the peripheral component interconnection standard) links and hot plugging. The ATF firmware involves the initialization of the PCI links in one hierarchy, i.e., the initialization of the root bridges of the PCI links of the CPUs (Central Processing Unit) and the PCI devices under the root bridges. However, in the DPU (Data Processing Unit) virtual systems of the ARM server, the T4 card is under the system of the DPU virtual cloud disk, is a PCI device of a second hierarchy under a PCI device, and is not a PCI device of the first hierarchy under the PCI link bridge under the ARM system. As a result, when the T4 card is restarted under a non-DPU virtual-cloud-disk system under the ARM-server system, no crashing happens, but, when the T4 card is restarted under a DPU virtual-cloud-disk system under the ARM system, crashes happens. That is because the T4 card has different PCI-device hierarchies under the different systems, and the initialization of the ATF did not take into consideration the demands on the restarting setting of the PCIs of the second hierarchy or even the third hierarchy. In this case, it is required to perform multi-hierarchy PCI-device initialization and register-configuring enabling to the ATF. Besides adding the PCI-link initialization hierarchy into the ATF, it is further required to add the AER recognition function of the PCI devices, and if it is not added, then AER (Advanced Error Reporting) error reporting is generated, which causes that the system still crashes. That is because the ARM server supports both of single-channel starting-up and double-channel starting-up, and if merely the single-channel, i.e., CPU0, PCI AER error-identification data are added into the ATF, in single-channel or double-channel starting-up, when the T4 card device is restarted, error reporting still happens. Therefore, it is required to add the setting of the PCI AER error-identification data for double-channel starting-up into the ATF, on which basis, after single-channel or double-channel starting-up, when the restarting setting of the T4 card is performed under the virtual-cloud-disk system of the DPU, AER crashing does not happen. Therefore, merely based on the two above-described adjustments in the ATF firmware, the technical problem of crashing of the PCI devices in restarting under the DPU virtual-cloud-disk system in the ARM-server system may be solved.

The technical solutions of the embodiments of the present application will be described in detail below with reference to the particular embodiments.

Referring to FIG. 1, FIG. 1 shows a flow chart of the steps of a method for configuring an ARM safe firmware applied to an ARM server according to an embodiment of the present application. As shown in FIG. 1, the method for configuring an ARM safe firmware applied to an ARM server may comprise Step 101 and Step 102.

Step 101: invoking the ARM safe firmware of the ARM server, and configuring a space register for a PCI link bridge and PCI devices of hierarchies of a quantity N under the PCI link bridge, wherein the ARM safe firmware is a processor firmware of the ARM server, and N is a positive integer greater than or equal to 3.

The embodiments of the present application may be applied to the scenes that, at the part of the ARM safe firmware, the PCI links of the CPUs and the scanning hierarchies of the PCI devices are increased to multiple hierarchies, and the AER-error-data-identification function is added to the PCI link bridges under all of the CPUs and the PCI devices, to solve the problem of crashing when the PCI device is restarted in the system or the system is restarted.

The embodiments of the present application may be applied to an ARM server; in other words, the subject of the implementation is an ARM server. The ARM server may comprise a BIOS (Basic Input Output System), and an ARM safe firmware (i.e., an ATF (firmware) and a UEFI firmware) is provided inside the BIOS.

In a particular implementation, after the starting-up of the ARM server, the BIOS may be loaded firstly, and subsequently the ARM safe firmware may be loaded. Furthermore, in the process of the loading and starting-up of the ARM safe firmware, by using the ARM safe firmware, the space register for a PCI link bridge and the PCI devices of hierarchies of a quantity N under the PCI link bridge is configured, wherein N is a positive integer greater than or equal to 3.

In a particular implementation, the method may comprise, in the process of the loading and starting-up of the ARM safe firmware, invoking the ARM safe firmware to scan the PCI link bridges and the PCI devices of the multiple hierarchies of all of the CPUs (i.e., all of the CPUs inside the ARM server, which may be a single CPU, and may also be a plurality of CPUs), and performing space-register configuring to the PCI devices of the multiple hierarchies obtained by the scanning. The implementing process may be described in detail below with reference to FIG. 2.

Referring to FIG. 2, FIG. 2 shows a flow chart of the steps of a method for configuring a space register according to an embodiment of the present application. As shown in FIG. 2, the method for configuring a space register may comprise Step 201 and Step 202.

Step 201: in a process of loading and starting-up of the ARM safe firmware, invoking the ARM safe firmware, and scanning the PCI link bridges and the PCI devices of the hierarchies of the quantity N of all of the CPUs, to obtain a scanning result.

In the present embodiment, after the BIOS has been loaded, the method may comprise loading the ARM safe firmware; and in the process of the loading and starting-up of the ARM safe firmware, invoking the ARM safe firmware, and scanning the PCI link bridges and the PCI devices of the hierarchies of the quantity N of all of the CPUs, to obtain a scanning result. Particularly, the ARM safe firmware may be used to scan all of the link bridges under the CPUs, and the PCI devices of the hierarchies of the quantity N under each of the link bridges, thereby obtaining the scanning result.

In a particular implementation, in the safety scanning, the method may comprise firstly loading the ARM safe firmware, performing safe-starting-up test and internal-memory initialization, and subsequently scanning. The implementing process may be described in detail below with reference to FIG. 4.

Referring to FIG. 4, FIG. 4 shows a flow chart of the steps of a method for configuring a PCI configuring space according to an embodiment of the present application. As shown in FIG. 4, the method for configuring a PCI configuring space may comprise Step 401, Step 402 and Step 403.

Step 401: loading the ARM safe firmware.

In the present embodiment, after the BIOS has been loaded, the ARM safe firmware may be loaded.

After the step of loading the ARM safe firmware, Step 402 is executed.

Step 402: performing safe-starting-up checking to the ARM safe firmware.

After the step of loading the ARM safe firmware, safe-starting-up checking may be performed to the ARM safe firmware, to check whether the ARM safe firmware has been safely started up. If the ARM safe firmware is not safely started up, then the flow ends. If the ARM safe firmware has been safely started up, then Step 403 is executed.

Step 403: in response to the safe-starting-up checking of the ARM safe firmware having succeeded, performing internal-memory initialization of the ARM safe firmware.

After the safe-starting-up checking of the ARM safe firmware has succeeded, internal-memory initialization of the ARM safe firmware may be performed, to configure the internal-memory space for the ARM safe firmware, to facilitate the configuring of the subsequent space register.

After the safety checking and the internal-memory initialization have been completed, the ARM safe firmware may be invoked to execute the flow of the scanning, and, simultaneously, the PCI configuring space corresponding to the PCI link bridge may be configured, to provide the internal memory for the configuring of the subsequent space register. The implementing process may be described in detail below with reference to FIG. 5.

Referring to FIG. 5, FIG. 5 shows a flow chart of the steps of a method for configuring a PCI configuring space according to an embodiment of the present application. As shown in FIG. 5, the method for configuring a PCI configuring space may comprise Step 501 and Step 502.

Step 501: in response to the internal-memory initialization of the ARM safe firmware having been completed, invoking the ARM safe firmware, and scanning the PCI link bridges and the PCI devices of the hierarchies of the quantity N of all of the CPUs, to obtain the scanning result.

In an embodiment of the present application, after the internal-memory initialization of the ARM safe firmware has been completed, the method may comprise invoking the ARM safe firmware, and scanning the PCI link bridges and the PCI devices of the hierarchies of the quantity N of all of the CPUs, to obtain a scanning result.

Step 502: configuring a PCI configuring space corresponding to the PCI link bridge in an internal memory that has been initialized.

Subsequently, the PCI configuring space corresponding to the PCI link bridge may be configured in the initial internal memory, wherein the PCI configuring space may be used for the configuring of the space register of the subsequent PCI devices.

After the step of invoking the ARM safe firmware, and scanning the PCI link bridges and the PCI devices of the hierarchies of the quantity N of all of the CPUs, to obtain the scanning result, Step 202 is executed.

Step 202: in response to the scanning result indicating that the PCI devices of the hierarchies of the quantity N exist under the PCI link bridge, configuring the space register for the PCI devices of the hierarchies of the quantity N under the PCI link bridge.

After the step of invoking the ARM safe firmware, and scanning the PCI link bridges and the PCI devices of the hierarchies of the quantity N of all of the CPUs, to obtain the scanning result, if the scanning result indicates that the PCI devices of the hierarchies of the quantity N exist under the PCI link bridge, then the space register for the PCI devices of the hierarchies of the quantity N under the PCI link bridge may be configured. Particularly, the method may comprise initializing the PCI devices of the hierarchies of the quantity N under the PCI link bridge, and configuring the space register. The implementing process may be described in detail below with reference to FIG. 3.

Referring to FIG. 3, FIG. 3 shows a flow chart of the steps of another method for configuring a space register according to an embodiment of the present application. As shown in FIG. 3, the method for configuring a space register may comprise Step 301 and Step 302.

Step 301: initializing the PCI devices of the hierarchies of the quantity N under the PCI link bridge.

In the present embodiment, if the scanning result indicates that the PCI devices of the hierarchies of the quantity N exist under the PCI link bridge, then the PCI devices of the hierarchies of the quantity N under the PCI link bridge may be initialized.

Step 302: configuring the space register for the PCI devices of the hierarchies of the quantity N under the PCI link bridge.

In the process of the initialization, the space register for the PCI devices of the hierarchies of the quantity N under the PCI link bridge may be configured. In other words, the process of initializing the PCI devices may write the space register into the corresponding space.

In the present application, by performing multi-hierarchy PCI-device initialization and register-configuring enabling to the ATF, the problem of crashing of the PCI devices in restarting under a DPU virtual-cloud-disk system in an ARM-server system may be solved.

When the space registers are configured individually for the PCI devices of the hierarchies of the quantity N under the PCI link bridge, because the PCI configuring space has already been configured in the internal memory of the ARM safe firmware that has been initialized, inside the PCI configuring space, the space registers may be configured individually for the PCI devices of the hierarchies of the quantity N under the PCI link bridge.

In a particular implementation of the present application, if the scanning result indicates that the hierarchies of the PCI devices under the PCI link bridge are less than N, a register configuring space corresponding to the PCI link bridge is reserved inside the PCI configuring space. By reserving the register configuring space, when subsequently the PCI devices of the multiple hierarchies are accessed, the configuring of the space register may be timely performed to the accessed PCI devices inside the reserved register configuring space.

After the step of invoking the ARM safe firmware of the ARM server, and configuring the space register for the PCI link bridge and the PCI devices of the hierarchies of the quantity N under the PCI link bridge, Step 102 is executed.

Step 102: inside the ARM safe firmware, adding AER error-identification data of all of CPUs of the ARM server.

After the step of invoking the ARM safe firmware of the ARM server, and configuring the space register for the PCI link bridge and the PCI devices of the hierarchies of the quantity N under the PCI link bridge, inside the ARM safe firmware, the AER error-identification data of all of CPUs of the ARM server may be added.

In the embodiments of the present application, by adding the AER error-identification data to all of the CPUs of the ARM server, on that basis, after single-channel or double-channel starting-up, when the restarting setting of, for example, a T4 card, is performed in the DPU virtual-cloud-disk system, the problem of AER crashing does not happen.

In a particular implementation, in the adding of the AER error-identification data, the corresponding AER error-identification data may be added to all of the PCI devices under the link bridges under all of the CPUs inside the ARM safe firmware. The implementing process may be described in detail below with reference to FIG. 6.

Referring to FIG. 6, FIG. 6 shows a flow chart of the steps of a method for adding AER error-identification data according to an embodiment of the present application. As shown in FIG. 6, the method for adding AER error-identification data may comprise Step 601 and Step 602.

Step 601: acquiring link bridges under all of the CPUs of the ARM server, and all of the PCI devices under the link bridges under all of the CPUs.

In an embodiment of the present application, in the adding of the AER error-identification data, the link bridges under all of the CPUs of the ARM server may be acquired.

In the present example, in the ARM server there may be merely one CPU, or two CPUs, or four CPUs, and so on. Particularly, the quantity of the CPUs in the ARM server may be decided according to practical situations, and is not limited in the present embodiment.

After the link bridges under all of the CPUs of the ARM server have been acquired, the PCI devices of the link bridges under each of the CPUs may be scanned, to obtain all of the PCI devices under the link bridges under all of the CPUs.

After the link bridges under all of the CPUs of the ARM server and all of the PCI devices under the link bridges under all of the CPUs have been acquired, Step 602 is executed.

Step 602: inside the ARM safe firmware, adding AER error-identification data of all of the PCI devices under the link bridges under all of the CPUs.

After the link bridges under all of the CPUs of the ARM server and all of the PCI devices under the link bridges under all of the CPUs have been acquired, inside the ARM safe firmware, the AER error-identification data of all of the PCI devices under the link bridges under all of the CPUs may be added.

In the embodiments of the present application, regardless of a single-channel server or a double-channel server, it is added the AER error-identification data, which may solve the problem of AER crashing when the restarting setting of, for example, a T4 card, is performed in the DPU virtual-cloud-disk system after the starting-up of the ARM server.

In a particular implementation, in the adding of the AER error-identification data, the method may comprise acquiring the AER configuration data of the link bridges under all of the CPUs; and based on the AER configuration data, adding the AER error-identification data. The implementing process may be described in detail below with reference to FIG. 7.

Referring to FIG. 7, FIG. 7 shows a flow chart of the steps of another method for adding AER error-identification data according to an embodiment of the present application. As shown in FIG. 7, the method for adding AER error-identification data may comprise Step 701 and Step 702.

Step 701: acquiring AER configuration data of the link bridges under all of the CPUs.

In an embodiment of the present application, after the link bridges under all of the CPUs of the ARM server and all of the PCI devices under the link bridges under all of the CPUs have been acquired, the method may comprise acquiring the AER configuration data of the link bridges under all of the CPUs.

After the AER configuration data of the link bridges under all of the CPUs have been acquired, Step 702 is executed.

Step 702: inside the ARM safe firmware, based on the AER configuration data, initializing all of the PCI devices under the link bridges under all of the CPUs, to add the AER error-identification data.

After the AER configuration data of the link bridges under all of the CPUs have been acquired, inside the ARM safe firmware, based on the AER configuration data, all of the PCI devices under the link bridges under all of the CPUs may be initialized, to add the AER error-identification data.

In the embodiments of the present application, by adding the AER error-identification data to all of the PCI devices under the link bridges by referring to the AER configuration data, the restarting of the normally used functions of the PCI devices in the multi-hierarchy system may be satisfied.

In a particular implementation, after the step of adding the AER error-identification data of all of CPUs of the ARM server, it may be detected whether the PCI devices under all of the PCI link bridges under the ARM safe firmware have been completely configured. If the PCI devices under all of the PCI link bridges have been completely configured, then the method may comprise starting up the UEFI firmware of the ARM server, and starting up and loading the virtual-cloud-disk system (for example, the DPU virtual-cloud-disk system).

If an un-configured PCI link bridge exists in the PCI devices under all of the PCI link bridges, then the configuring flow is continuously performed to the un-configured PCI link bridge. The implementing process may be described in detail below with reference to FIG. 8.

Referring to FIG. 8, FIG. 8 shows a flow chart of the steps of a method for configuring a PCI device according to an embodiment of the present application. As shown in FIG. 8, the method for configuring a PCI device may comprise Step 801 and Step 802.

Step 801: in response to an un-configured PCI link bridge existing in the PCI devices under all of the PCI link bridges, acquiring the PCI devices under the un-configured PCI link bridge.

In the present embodiment, if an un-configured PCI link bridge exists in the PCI devices under all of the PCI link bridges, then the PCI devices under the un-configured PCI link bridge may be acquired.

Step 802: performing the register configuring and the adding of the AER error-identification data sequentially to the un-configured PCI link bridge and the PCI devices under the un-configured PCI link bridge.

Subsequently, the register configuring and the adding of the AER error-identification data may be performed sequentially to the un-configured PCI link bridge and the PCI devices under the un-configured PCI link bridge.

The embodiments of the present application, by detecting the un-configured PCI link bridge, may prevent omission of a PCI link bridge or PCI device, which results in crashing caused by a PCI device under a PCI link bridge that is not configured as described above.

In a particular implementation, after the virtual-cloud-disk system has been started up, if the PCI devices are restarted and the virtual-cloud-disk system is restarted, it may be determined whether crashing happens in the ARM server. The implementing process may be described in detail below with reference to FIG. 9.

Referring to FIG. 9, FIG. 9 shows a flow chart of the steps of a method for determining completion of configuring according to an embodiment of the present application. As shown in FIG. 9, the method for determining completion of configuring may comprise Step 901 and Step 902.

Step 901: in response to the PCI devices being restarted and the virtual-cloud-disk system being restarted, determining whether crashing happens in the ARM server.

In the present embodiment, after the virtual-cloud-disk system has been started up and loaded, the method may comprise restarting the PCI devices under the ARM server, and restarting the virtual-cloud-disk system, to detect whether the ARM server crashes. Particularly, after the DPU virtual-cloud-disk operating system has been started up and loaded, the system emits a PCI command to restart the PCI devices, for example, a T4 card, and the system commands to restart the DPU virtual-cloud-disk operating system. Simultaneously, it is detected whether the ARM server crashes.

Step 902: in response to crashing not happening in the ARM server, determining that the configuring of the ARM safe firmware succeeds.

If it is determined that the ARM server does not crash, then it can be determined that the configuring of the ARM safe firmware has succeeded, and the problem of crashing of the PCI devices in restarting has already been thoroughly solved.

Certainly, if crashing still happens in the ARM server, then that might be for other reasons. In this case, a crashing alarming message may be outputted, to prompt the operation and maintenance staff to find out the reason for the crashing.

The flow of restarting the PCI devices in the ARM-server supporting system may be described in detail below with reference to FIG. 10.

Figure 10:
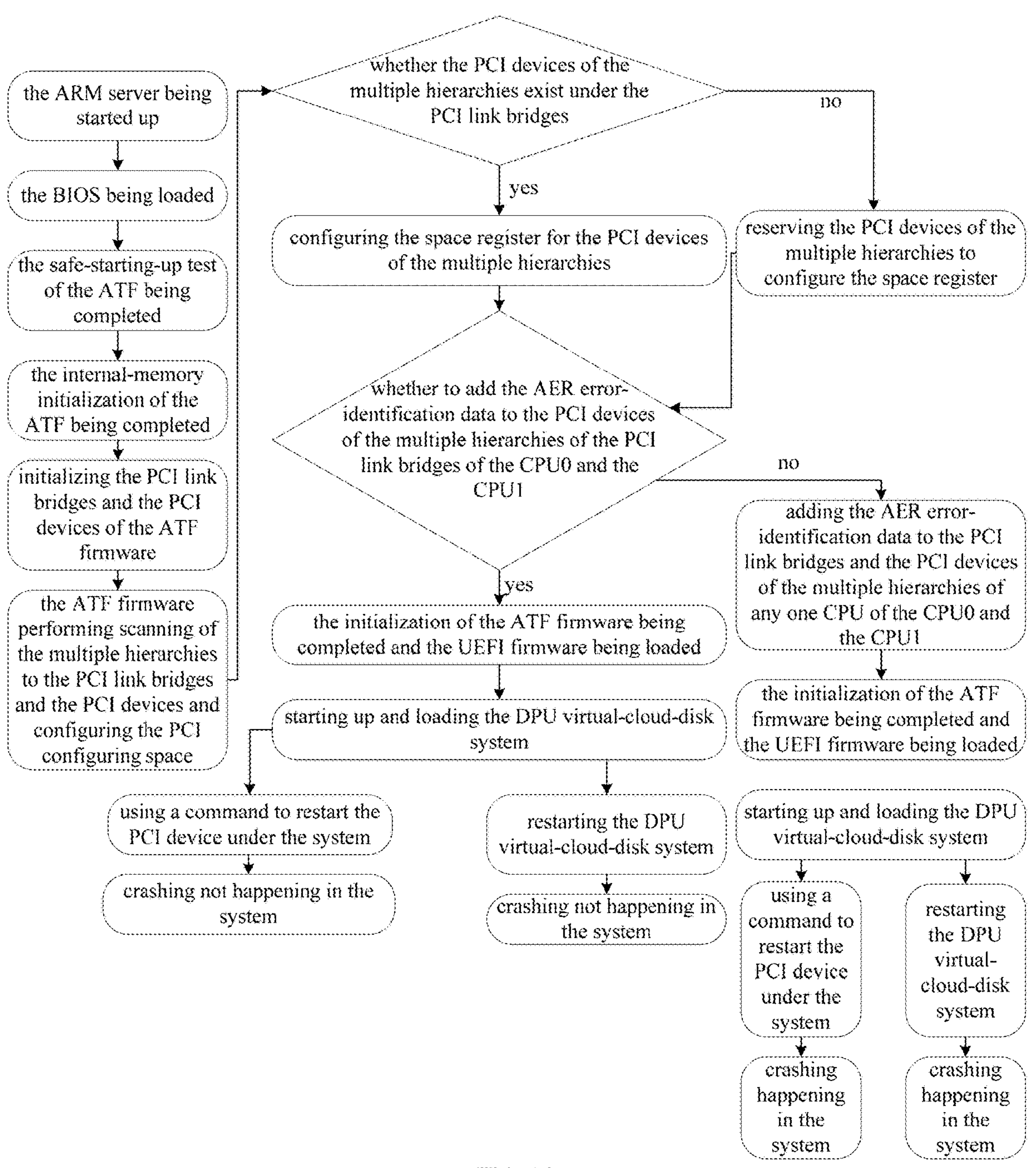
FIG. 10 is a flow chart of restarting of PCI devices in an ARM-server supporting system according to an embodiment of the present application.

Referring to FIG. 10, FIG. 10 shows a flow chart of restarting of PCI devices in an ARM-server supporting system according to an embodiment of the present application. As shown in FIG. 10, the flow may comprise the following steps:

Step 1: The ARM server (which, in the present example, is an ARM server of a double-channel starting-up mechanism) is started up, the BIOS firmware is loaded, and the ATF mirror-image firmware is firstly loaded.

Step 2: In the process of loading and starting-up of the ATF, after the safe starting-up and the starting-up of the internal-memory initialization have been completed, the part of the initialization of the PCI links is performed, and according to the state of division of the PCI link bridges, the PCI link bridges and the PCI devices are scanned and initialized. In this case, the ATF is changed from the solution of scanning and initializing the PCI link bridges and the PCI device of one hierarchy to the solution of scanning the PCI links and the PCI devices of the multiple hierarchies. If multi-hierarchy devices exist in the current PCI link, then scanning and initialization of the multi-hierarchy PCI devices are performed. If no multi-hierarchy devices exist in the current PCI link, then the function of the multi-hierarchy scanning of the PCI-device space is started up and reserved, i.e., reserving the register configuring space.

Step 3: After Step 2 has been completed, an AER table (containing the AER configuration data of the PCI link bridges) of the PCI link bridges may be initialized. If the AER table is not initialized, that results in the problem of crashing of the PCI devices in restarting in the system. The initialization of the table requires initializing all of the PCI links and the PCI devices of two CPUs. If merely the PCI links of any 1 CPU are initialized, that results in the problem of crashing of the PCI devices in restarting in the system. The initialization of the AER table requires setting the AER data of the PCI links and the PCI devices of the multiple hierarchies, to satisfy the restarting of the normally used functions of the PCI devices in the multi-hierarchy system.

Step 4: After the initialization of the firmware of the ARM server has been completed, the UEFI firmware is started up, and continuously the DPU virtual-cloud-disk operating system is started up and entered.

Step 5: After the DPU virtual-cloud-disk operating system has been started up and loaded, when the system emits a PCI command to restart the PCI devices, for example, a T4 card, the problem of restarting crashing does not happen. Alternatively, when the system commands to restart the DPU virtual-cloud-disk operating system, the problem of restarting crashing does not happen either. Therefore, the problem of crashing of the PCI devices in restarting has already been thoroughly solved.

Step 6: Certainly, if the AER error-identification data are added to merely the PCI link bridges and the PCI devices of the multiple hierarchies of any one CPU of the two CPUs, after the virtual-cloud-disk system has been started up and loaded, when the system emits a PCI command to restart the PCI devices, for example, a T4 card, the problem of restarting crashing happens. Alternatively, when the system commands to restart the DPU virtual-cloud-disk operating system, the problem of restarting crashing happens.

In the present embodiment, according to the characteristics of the firmware of the ARM server and the problem of the system crashing caused by restarting of the PCI devices under the DPU virtual-cloud-disk system or restarting of the virtual-cloud-disk system, from the locating of the root cause of the problem, the ATF is required to support scanning of the PCI devices of the multiple hierarchies and configure the managing register. At the same time, because restarting of the PCI devices under the DPU virtual-cloud-disk system or restarting of the system causes generation of AER errors and continuous crashing, merely by adding the AER-error-data-identification function into the CPU0 and the PCI link bridges and the PCI devices of the PCIs in the ATF, the problem of crashing caused by AER errors may be solved. The above-described 2 points must be satisfied simultaneously, and the problem of the system crashing caused by restarting of the PCI devices under the DPU virtual-cloud-disk system or restarting of the system may be thoroughly solved. If the AER-error-data-identification function of the PCI bridges and the PCI devices is added into any one of the CPU0 and the CPU1, the problem of crashing still exists. Regardless of a single-channel server or a double-channel server, it is required to add the AER-error-data-identification function to the PCI link bridges and the PCI devices of the CPU0 and the CPU1. Therefore, in the embodiments of the present application, at the part of the ATF firmware, the PCI links of the CPUs and the scanning hierarchies of the PCI devices are increased to multiple hierarchies, which are least 3 hierarchies or more. At the same time, merely by adding the AER-error-data-identification function to the PCI link bridges and the PCI devices of the CPU0 and the CPU1, the problem of crashing in restarting of the PCI devices under the system or restarting of the system may be solved.

The flow of the configuring will be described in detail below with reference to the hardware architecture.

Figure 11:
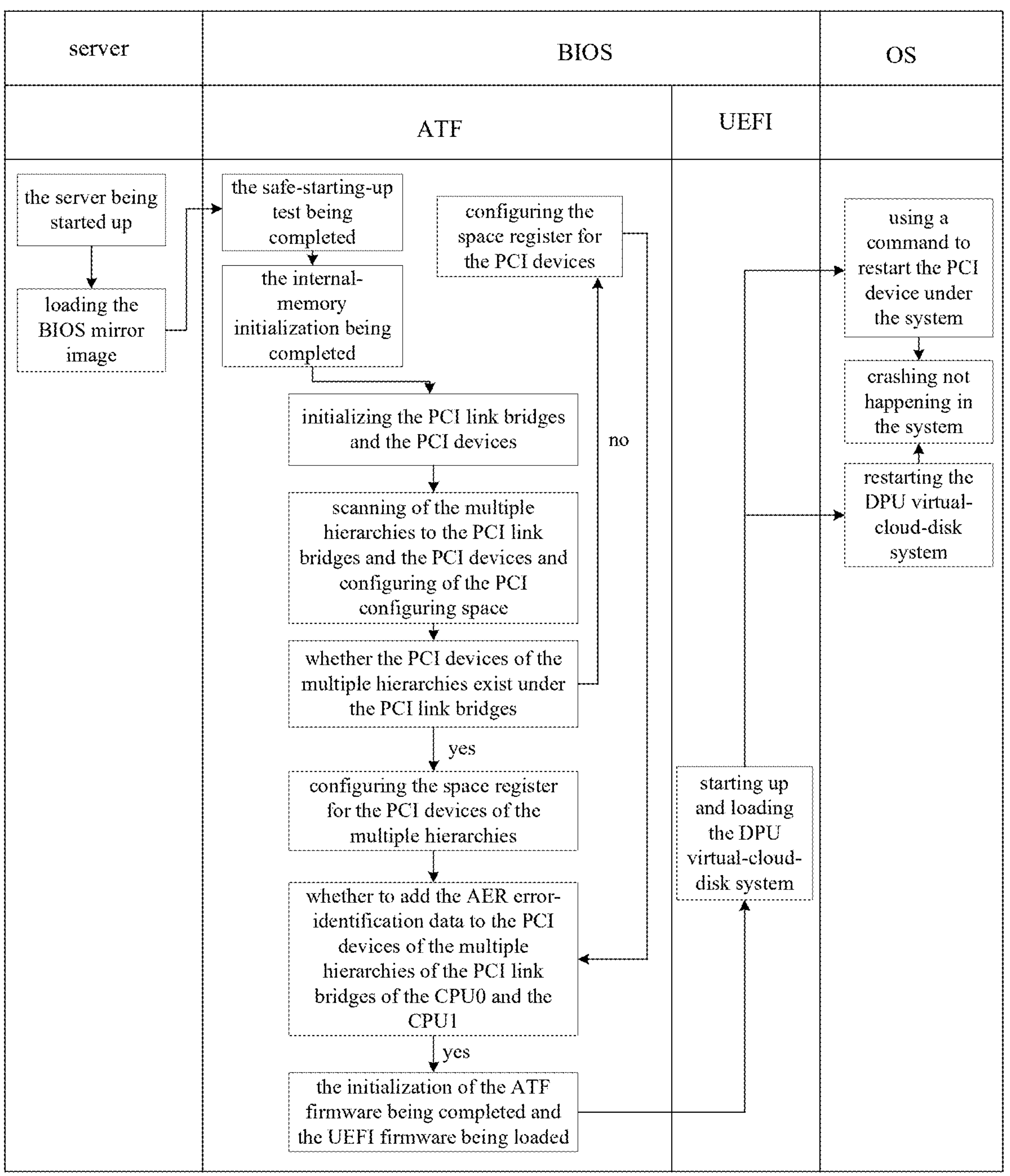
FIG. 11 is a schematic diagram of a hardware architecture according to an embodiment of the present application.

Referring to FIG. 11, FIG. 11 shows a schematic diagram of a hardware architecture according to an embodiment of the present application. As shown in FIG. 11, the hardware architecture according to the present embodiment may comprise an ARM server, an OS (Operating System), a BIOS under the ARM server, and a UTF firmware and a UEFI firmware under the BIOS.

In the particular flow, the ARM server may be started up firstly, and, after the starting-up of the ARM server, the BIOS mirror image may be loaded. Subsequently, the ATF mirror-image firmware may be loaded. In the process of the starting-up of the ATF firmware, the safe-starting-up checking may be performed, and after it has been completed, the internal memory is initialized.

After the internal-memory initialization has been completed, the PCI link bridges and the PCI devices may be initialized. At this point, scanning of the multiple hierarchies of the PCI link bridges and the PCI devices may be performed, and the PCI configuring space may be configured.

According to the scanning result, it is determined whether the PCI devices of the multiple hierarchies exist under the PCI link bridges. If no PCI devices of the multiple hierarchies exist under the PCI link bridges, then the space for configuring the space register of the PCI devices, i.e., the register configuring space, is reserved. If the PCI devices of the multiple hierarchies exist under the PCI link bridges, then the space register may be configured for the PCI devices of the multiple hierarchies.

Subsequently, it may be selected whether to add the AER error-identification data to the PCI devices of the multiple hierarchies of the PCI link bridges of the CPU0 and the CPU1. If it is selected to add the AER error-identification data to the PCI devices of the multiple hierarchies of the PCI link bridges of the CPU0 and the CPU1, then the AER table is initialized, to set the AER data of the PCI links and the PCI devices of the multiple hierarchies.

After the initialization of the ATF firmware has been completed, the UEFI firmware may be loaded, and the DPU virtual-cloud-disk system may be started up and loaded.

When the system emits a PCI command to restart the PCI devices, for example, a T4 card, the problem of restarting crashing does not happen. Alternatively, when the system commands to restart the DPU virtual-cloud-disk operating system, the problem of restarting crashing does not happen either. Therefore, the problem of crashing of the PCI devices in restarting has already been thoroughly solved.

In the embodiments of the present application, according to the firmware division of the ARM-architecture server and the particular state of the practical applications of the ARM server, in order to solve the problem of crashing in restarting of the DPU virtual cloud disk or restarting of the PCI devices in the virtual cloud disk, in the ATF, scanning of the multiple hierarchies is performed to the PCI link bridges and the PCI devices and the managing register is configured. At the same time, the AER-error-data-identification function is added to each of the PCI link bridges and the PCI devices of the CPU0 and the CPU1, and if it is not added then two times of crashing happen in restarting. Therefore, by using such a solution, the problem of two times of crashing in restarting under the system and restarting of the PCI devices may be solved. Therefore, in the present embodiment, by increasing the scanning hierarchies in the ATF firmware of the PCI link bridges and the PCI devices and configuring the register configuration, wherein regardless of a single-channel server or a double-channel server, it is required to add the AER-error-data-identification function for each of the PCI link bridges and the PCI devices of the CPU0 and the CPU1 in the ATF, the problem of crashing in restarting under a DPU virtual-cloud-disk system or in restarting of the PCI devices under a DPU virtual-cloud-disk system may be thoroughly solved.

In the method for configuring an ARM safe firmware applied to an ARM server according to the embodiments of the present application, the ARM safe firmware of the ARM server is invoked, and a space register for a PCI link bridge and PCI devices of hierarchies of a quantity N under the PCI link bridge is configured, wherein the ARM safe firmware is a processor firmware of the ARM server, and N is a positive integer greater than or equal to 3. Inside the ARM safe firmware, the AER error-identification data of all of the CPUs of the ARM server are added. In the embodiments of the present application, by increasing the scanning hierarchies in the ATF firmware of the PCI link bridges and the PCI devices and configuring the register configuration, wherein regardless of a single-channel server or a double-channel server, it is required to add the AER-error-data-identification function for each of the PCI link bridges and the PCI devices of all of the CPUs in the ATF, the problem of crashing in restarting under a DPU virtual-cloud-disk system or in restarting of the PCI devices under a DPU virtual-cloud-disk system may be effectively solved.

Figure 12:
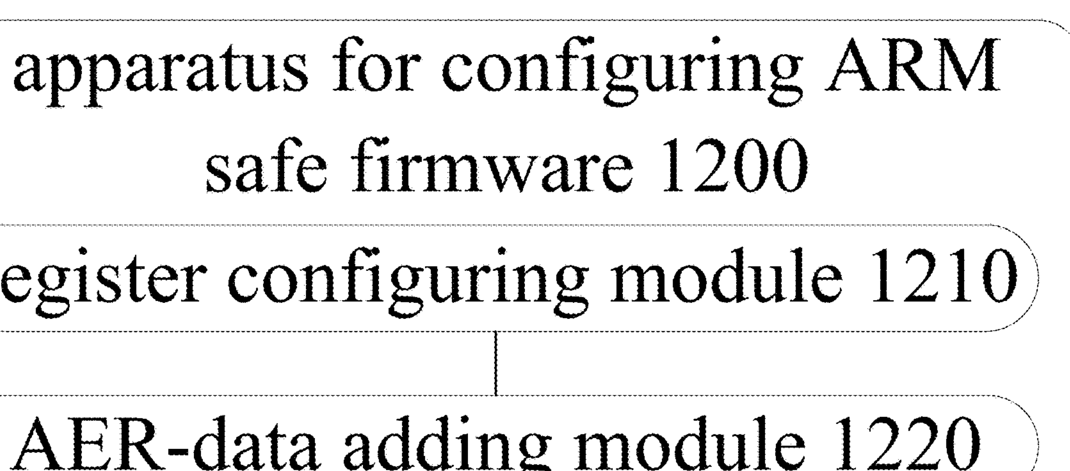
FIG. 12 is a schematic structural diagram of an apparatus for configuring an ARM safe firmware applied to an ARM server according to an embodiment of the present application.

Referring to FIG. 12, FIG. 12 shows a schematic structural diagram of an apparatus for configuring an ARM safe firmware applied to an ARM server according to an embodiment of the present application. As shown in FIG. 12, the apparatus for configuring an ARM safe firmware applied to an ARM server 1200 may comprise the following modules:

a register configuring module 1210 configured for invoking the ARM safe firmware of the ARM server, and configuring a space register for a PCI link bridge and PCI devices of hierarchies of a quantity N under the PCI link bridge, wherein the ARM safe firmware is a processor firmware of the ARM server, and N is a positive integer greater than or equal to 3; and an AER-data adding module 1220 configured for, inside the ARM safe firmware, adding AER error-identification data of all of CPUs of the ARM server.

In some embodiments, the register configuring module comprises:

a scanning-result acquiring unit configured for, in a process of loading and starting-up of the ARM safe firmware, invoking the ARM safe firmware, and scanning the PCI link bridges and the PCI devices of the hierarchies of the quantity N of all of the CPUs, to obtain a scanning result; and a space-register configuring unit configured for, in response to the scanning result indicating that the PCI devices of the hierarchies of the quantity N exist under the PCI link bridge, configuring the space register for the PCI devices of the hierarchies of the quantity N under the PCI link bridge.

In some embodiments, the space-register configuring unit comprises:

a PCI-device initializing subunit configured for initializing the PCI devices of the hierarchies of the quantity N under the PCI link bridge; and a space-register configuring subunit configured for configuring the space register for the PCI devices of the hierarchies of the quantity N under the PCI link bridge.

In some embodiments, the apparatus comprises:

an ARM-safe-firmware loading module configured for, in response to the ARM server having been started up and loading of a BIOS having succeeded, loading the ARM safe firmware;

a safe-starting-up checking module configured for performing safe-starting-up checking to the ARM safe firmware; and an internal-memory initializing module configured for, in response to the safe-starting-up checking of the ARM safe firmware having succeeded, performing internal-memory initialization of the ARM safe firmware.

In some embodiments, the scanning-result acquiring unit comprises:

a scanning-result acquiring subunit configured for, in response to the internal-memory initialization of the ARM safe firmware having been completed, invoking the ARM safe firmware, and scanning the PCI link bridges and the PCI devices of the hierarchies of the quantity N of all of the CPUs, to obtain the scanning result; and a PCI-configuring-space configuring subunit configured for configuring a PCI configuring space corresponding to the PCI link bridge in an internal memory that has been initialized.

In some embodiments, the space-register configuring unit comprises:

a register configuring subunit configured for, inside the PCI configuring space, configuring space registers individually for the PCI devices of the hierarchies of the quantity N under the PCI link bridge.

In some embodiments, the apparatus further comprises:

a configuring-space reserving module configured for, in response to the scanning result indicating that the hierarchies of the PCI devices under the PCI link bridge are less than N, reserving a register configuring space corresponding to the PCI link bridge inside the PCI configuring space.

In some embodiments, the AER-data adding module comprises:

a PCI-device acquiring unit configured for acquiring link bridges under all of the CPUs of the ARM server, and all of the PCI devices under the link bridges under all of the CPUs; and an AER-data adding unit configured for, inside the ARM safe firmware, adding AER error-identification data of all of the PCI devices under the link bridges under all of the CPUs.

In some embodiments, the AER-data adding unit comprises:

a configuration-data acquiring subunit configured for acquiring AER configuration data of the link bridges under all of the CPUs; and an AER-data adding subunit configured for, inside the ARM safe firmware, based on the AER configuration data, initializing all of the PCI devices under the link bridges under all of the CPUs, to add the AER error-identification data.

In some embodiments, the apparatus further comprises:

a configuring-completion detecting module configured for detecting whether the PCI devices under all of instances of the PCI link bridge under the ARM safe firmware have been completely configured; and a virtual-cloud-disk-system loading module configured for, in response to the PCI devices under all of the PCI link bridges having been completely configured, starting up an UEFI firmware of the ARM server, and starting up and loading a virtual-cloud-disk system.

In some embodiments, the apparatus further comprises:

an un-configured-device acquiring module configured for, in response to an un-configured PCI link bridge existing in the PCI devices under all of the PCI link bridges, acquiring the PCI devices under the un-configured PCI link bridge; and a PCI-device configuring module configured for performing the register configuring and the adding of the AER error-identification data sequentially to the un-configured PCI link bridge and the PCI devices under the un-configured PCI link bridge.

In some embodiments, the apparatus further comprises:

a crashing determining module configured for, in response to the PCI devices being restarted and the virtual-cloud-disk system being restarted, determining whether crashing happens in the ARM server; and a configuring-succeeding determining module configured for, in response to crashing not happening in the ARM server, determining that the configuring of the ARM safe firmware succeeds.

In the apparatus for configuring an ARM safe firmware applied to an ARM server according to the embodiments of the present application, the ARM safe firmware of the ARM server is invoked, and a space register for a PCI link bridge and PCI devices of hierarchies of a quantity N under the PCI link bridge is configured, wherein the ARM safe firmware is a processor firmware of the ARM server, and N is a positive integer greater than or equal to 3. Inside the ARM safe firmware, the AER error-identification data of all of the CPUs of the ARM server are added. In the embodiments of the present application, by increasing the scanning hierarchies in the ATF firmware of the PCI link bridges and the PCI devices and configuring the register configuration, wherein regardless of a single-channel server or a double-channel server, it is required to add the AER-error-data-identification function for each of the PCI link bridges and the PCI devices of all of the CPUs in the ATF, the problem of crashing in restarting under a DPU virtual-cloud-disk system or in restarting of the PCI devices under a DPU virtual-cloud-disk system may be effectively solved.

In addition, an embodiment of the present application further provides an electronic device, wherein the electronic device comprises: a memory, a processor and a computer program that is stored in the memory and is executable in the processor, and the computer program, when executed by the processor, implements the method for configuring an ARM safe firmware applied to an ARM server stated above.

Figure 13:
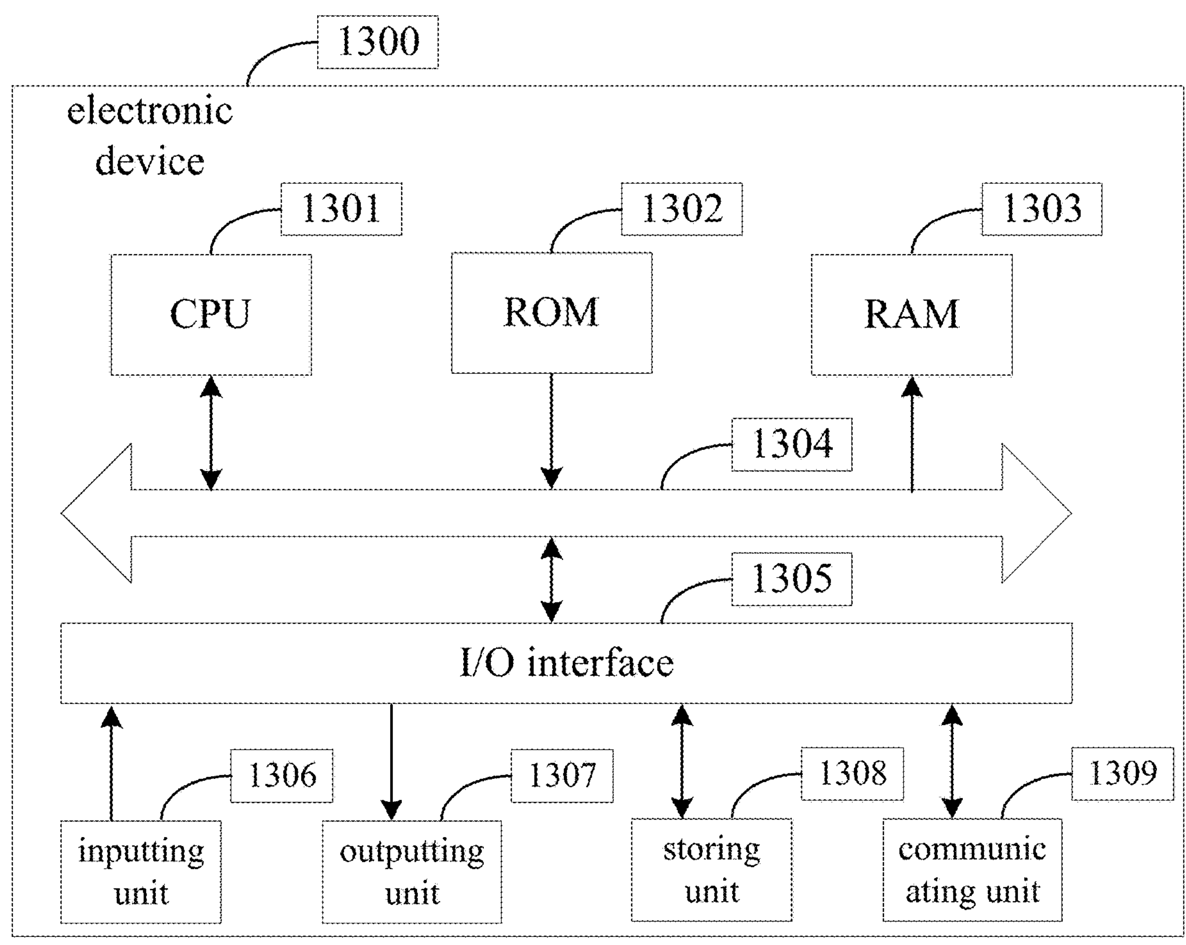
FIG. 13 is a schematic structural diagram of an electronic device according to an embodiment of the present application.

FIG. 13 shows a schematic structural diagram of an electronic device 1300 according to an embodiment of the present application. As shown in FIG. 13, the electronic device 1300 comprises a central processing unit (CPU) 1301, which may, according to a computer program instruction stored in a read-only memory (ROM) 1302 or a computer program instruction loaded from a storing unit 1308 into a random access memory (RAM) 1303, execute various proper actions and processing. The RAM 1303 may also store various programs and data required by the operations of the electronic device 1300. The CPU 1301, the ROM 1302 and the RAM 1303 are connected to each other by a bus 1304. An inputting/outputting (I/O) interface 1305 is also connected to the bus 1304.

Multiple components of the electronic device 1300 are connected to the I/O interface 1305, including: an inputting unit 1306, for example, a keyboard, a mouse and a microphone; an outputting unit 1307, for example, various types of displays and loudspeakers; a storing unit 1308, for example, a magnetic disk and an optical disk; and a communicating unit 1309, for example, a network card, a modem and a wireless-communication transceiver. The communicating unit 1309 allows the electronic device 1300 to exchange information and data with other devices via a computer network such as Internet and/or various telecommunication networks.

The processes and processing described above may be executed by the processing unit 1301. For example, the method according to any one of the above embodiments may be implemented as a computer software program, which is tangibly contained in a computer-readable medium, for example, the storing unit 1308. In some embodiments, part or the whole of the computer program may be loaded and/or installed to the electronic device 1300 via the ROM 1302 and/or the communicating unit 1309. The computer program, when loaded to the RAM 1303 and executed by the CPU 1301, may execute one or more actions of the method described above.

An embodiment of the present application further provides a non-volatile computer-readable storage medium, wherein the non-volatile computer-readable storage medium stores a computer program, and the computer program, when executed by a processor, implements the steps of the embodiments of the method for configuring an ARM safe firmware applied to an ARM server stated above, to obtain the same technical effect, which, in order to avoid replication, is not discussed further herein. The non-volatile computer-readable storage medium is, for example, a Read-Only Memory (referred to for short as ROM), a Random Access Memory (referred to for short as RAM), a diskette and an optical disk.

The above are merely embodiments of the present application, and the protection scope of the present application is not limited thereto. All of the variations or substitutions that a person skilled in the art can easily envisage within the technical scope disclosed by the present application should fall within the protection scope of the present application. Therefore, the protection scope of the present application should be subject to the protection scope of the claims.

The invention claimed is:

1. A method for configuring an ARM (Advanced Reduced Instruction Set Computing Machines) safe firmware applied to an ARM server, wherein the method comprises:

by the ARM server, invoking the ARM safe firmware of the ARM server, and configuring a space register for a PCI (Peripheral Component Interconnect) link bridge and PCI devices of hierarchies of a quantity N under the PCI link bridge, wherein the ARM safe firmware is a processor firmware of the ARM server, and N is a positive integer greater than or equal to 3; and inside the ARM safe firmware, adding, by the ARM server, AER (Advanced Error Reporting) error-identification data of all CPUs (Central Processing Units) of the ARM server.

2. The method according to claim 1, wherein the step of invoking the ARM safe firmware of the ARM server, and configuring the space register for the PCI link bridge and the PCI devices of the hierarchies of the quantity N under the PCI link bridge comprises:

in a process of loading and starting-up of the ARM safe firmware, invoking the ARM safe firmware, and scanning the PCI link bridges and the PCI devices of the hierarchies of the quantity N of all of the CPUs, to obtain a scanning result; and in response to the scanning result indicating that the PCI devices of the hierarchies of the quantity N exist under the PCI link bridge, configuring the space register for the PCI devices of the hierarchies of the quantity N under the PCI link bridge.

3. The method according to claim 2, wherein the step of configuring the space register for the PCI devices of the hierarchies of the quantity N under the PCI link bridge comprises:

initializing the PCI devices of the hierarchies of the quantity N under the PCI link bridge; and configuring the space register for the PCI devices of the hierarchies of the quantity N under the PCI link bridge.

4. The method according to claim 2, wherein before the step of invoking the ARM safe firmware, and scanning the PCI link bridges and the PCI devices of the hierarchies of the quantity N of all of the CPUs, to obtain the scanning result, the method comprises:

in response to the ARM server having been started up and loading of a BIOS (Basic Input Output System) having succeeded, loading the ARM safe firmware;

performing safe-starting-up checking to the ARM safe firmware; and in response to the safe-starting-up checking of the ARM safe firmware having succeeded, performing internal-memory initialization of the ARM safe firmware.

5. The method according to claim 4, wherein the step of invoking the ARM safe firmware, and scanning the PCI link bridges and the PCI devices of the hierarchies of the quantity N of all of the CPUs, to obtain the scanning result comprises:

in response to the internal-memory initialization of the ARM safe firmware having been completed, invoking the ARM safe firmware, and scanning the PCI link bridges and the PCI devices of the hierarchies of the quantity N of all of the CPUs, to obtain the scanning result; and configuring a PCI configuring space corresponding to the PCI link bridge in an internal memory that has been initialized.

6. The method according to claim 5, wherein the step of invoking the ARM safe firmware, and scanning the PCI link bridges and the PCI devices of the hierarchies of the quantity N of all of the CPUs further comprises:

according to a state of division of the PCI link bridge, scanning the PCI link bridge and the PCI devices of the hierarchies of the quantity N.

7. The method according to claim 5, wherein the step of configuring the space register for the PCI devices of the hierarchies of the quantity N under the PCI link bridge comprises:

inside the PCI configuring space, configuring space registers individually for the PCI devices of the hierarchies of the quantity N under the PCI link bridge.

8. The method according to claim 5, wherein after the step of invoking the ARM safe firmware, and scanning the PCI link bridges and the PCI devices of the hierarchies of the quantity N of all of the CPUs, to obtain the scanning result, the method further comprises:

in response to the scanning result indicating that the hierarchies of the PCI devices under the PCI link bridge are less than N, reserving a register configuring space corresponding to the PCI link bridge inside the PCI configuring space.

9. The method according to claim 8, wherein after the step of reserving the register configuring space corresponding to the PCI link bridge inside the PCI configuring space, the method further comprises:

inside the reserved register configuring space, configuring the space register for the PCI devices of the hierarchies of the quantity N that are accessed subsequently.

10. The method according to claim 1, wherein the step of, inside the ARM safe firmware, adding the AER error-identification data of all of the CPUs of the ARM server comprises:

acquiring link bridges under all of the CPUs of the ARM server, and all of the PCI devices under the link bridges under all of the CPUs; and inside the ARM safe firmware, adding AER error-identification data of all of the PCI devices under the link bridges under all of the CPUs.

11. The method according to claim 10, wherein the step of, inside the ARM safe firmware, adding the AER error-identification data of all of the PCI devices under the link bridges under all of the CPUs comprises:

acquiring AER configuration data of the link bridges under all of the CPUs; and inside the ARM safe firmware, based on the AER configuration data, initializing all of the PCI devices under the link bridges under all of the CPUs, to add the AER error-identification data.

12. The method according to claim 1, wherein after the step of adding the AER error-identification data of all CPUs of the ARM server, the method further comprises:

detecting whether the PCI devices under all of instances of the PCI link bridge under the ARM safe firmware have been completely configured; and in response to the PCI devices under all of the PCI link bridges having been completely configured, starting up an UEFI (Unified Extensible Firmware Interface) firmware of the ARM server, and starting up and loading a virtual-cloud-disk system.

13. The method according to claim 12, wherein after the step of detecting whether the PCI devices under all of the PCI link bridges under the ARM safe firmware have been completely configured, the method further comprises:

in response to an un-configured PCI link bridge existing in the PCI devices under all of the PCI link bridges, acquiring the PCI devices under the un-configured PCI link bridge; and performing the register configuring and the adding of the AER error-identification data sequentially to the un-configured PCI link bridge and the PCI devices under the un-configured PCI link bridge.

14. The method according to claim 12, wherein after the step of starting up the UEFI firmware of the ARM server, and starting up and loading the virtual-cloud-disk system, the method further comprises:

in response to the PCI devices being restarted and the virtual-cloud-disk system being restarted, determining whether crashing happens in the ARM server; and in response to crashing not happening in the ARM server, determining that the configuring of the ARM safe firmware succeeds.

15. The method according to claim 14, wherein the step of, in response to the PCI devices being restarted and the virtual-cloud-disk system being restarted, determining whether crashing happens in the ARM server comprises:

in response to the PCI devices not having a problem of restarting crashing, and the virtual-cloud-disk operating system not having the problem of restarting crashing either, determining that crashing does not happen in the ARM server.

16. The method according to claim 14, wherein after the step of determining whether crashing happens in the ARM server, the method further comprises:

in response to crashing happening in the ARM server, outputting a crashing alarming message.

17. The method according to claim 1, wherein the ARM server comprises at least one instance of the CPUs.

18. An electronic device, wherein the electronic device comprises:

a memory, a processor and a computer program that is stored in the memory and is executable in the processor, and the computer program, when executed by the processor, implements the method for configuring an ARM safe firmware applied to an ARM server according to claim 1.

19. A non-volatile computer-readable storage medium, wherein an instruction in the non-volatile computer-readable storage medium, when executed by a processor of an electronic device, enables the electronic device to implement the method for configuring an ARM safe firmware applied to an ARM server according to claim 1.

* * * * *